United States Patent
Mihm et al.

(10) Patent No.: US 7,552,217 B2
(45) Date of Patent: *Jun. 23, 2009

(54) SYSTEM AND METHOD FOR AUTOMATIC FIRMWARE IMAGE RECOVERY FOR SERVER MANAGEMENT OPERATIONAL CODE

(75) Inventors: James T. Mihm, Gresham, OR (US); William R. Hannon, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 714 days.

This patent is subject to a terminal disclaimer.

(21) Appl. No.: 10/820,532

(22) Filed: Apr. 7, 2004

(65) Prior Publication Data

US 2005/0228888 A1    Oct. 13, 2005

(51) Int. Cl.
*G06F 15/16* (2006.01)
*G06F 15/173* (2006.01)
*G06F 15/177* (2006.01)

(52) U.S. Cl. ............................ 709/227; 713/2; 713/100

(58) Field of Classification Search ................ 713/100, 713/1, 2; 714/5, 15; 717/168, 17; 709/200–203, 709/217–228

See application file for complete search history.

(56) References Cited

U.S. PATENT DOCUMENTS

| | | | | |
|---|---|---|---|---|
| 6,367,007 | B1* | 4/2002 | Do | 713/2 |
| 6,990,577 | B2* | 1/2006 | Autry | 713/100 |
| 7,136,994 | B2* | 11/2006 | Zimmer et al. | 713/2 |
| 7,293,165 | B1* | 11/2007 | Tobias | 713/1 |
| 2004/0098521 | A1* | 5/2004 | Lin | 710/72 |
| 2004/0260936 | A1* | 12/2004 | Hiray et al. | 713/200 |
| 2005/0038808 | A1* | 2/2005 | Kutch | 707/102 |
| 2005/0228888 | A1* | 10/2005 | Mihm et al. | 709/227 |
| 2005/0240669 | A1* | 10/2005 | Khanna et al. | 709/225 |

OTHER PUBLICATIONS www.intel.com/design/servers/impi, Intelligent Platform management interface (IPMI), Aug. 16, 2008, pp. 1-6.*
L440GX+, Lancewood Server, Baseboard Management Controller, Frimware version 1.07, Nov. 24, 1999.*

* cited by examiner

*Primary Examiner*—Haresh N Patel
(74) *Attorney, Agent, or Firm*—Joni D. Stutman-Horn

(57) ABSTRACT

An embodiment of the present invention is a system and method relating to automatic firmware image recovery. When a server equipped with a baseboard management controller (BMC) and operational code detects that its operational code image is corrupted or out of date, it broadcasts a request for an image update over an out-of-band network. One or more donor systems on the network may respond to the request and send the requestor a new image. The recipient system use management policies to determine from which donor system to accept an update.

24 Claims, 3 Drawing Sheets

Servers enabled with wireless communications via Bluetooth or 802.11x protocols.

SYSTEM AND METHOD FOR AUTOMATIC FIRMWARE IMAGE RECOVERY FOR SERVER MANAGEMENT OPERATIONAL CODE

CROSS-REFERENCE TO RELATED APPLICATION

The present application is related to U.S. patent application Ser. No. 10/821,037, entitled "AUTOMATIC FIRMWARE UPDATE PROXY," to J. Mihm and W. Harmon and assigned to the assignee of the present invention (and filed concurrently herewith).

FIELD OF THE INVENTION

An embodiment of the present invention relates generally to network computing and, more specifically, to automatic image recovery for server management firmware, where valid images are retrieved over a network.

BACKGROUND INFORMATION

Various mechanisms exist for out-of-band (OOB) server management. Typically a management console or system communicates with the baseboard management controller (BMC) of a server on a network. The OOB communications have the advantage of being able to communicate with the server when it is not booted up. The BMC typically operates on standby power, even when the server is not technically powered on. This enables the management console to access power operations, temperature and other data from sensors communicating with the server BMC. If the temperature of the server is too hot, for instance, the management console can prevent a power up, or initiate a shutdown prior to the server overheating.

The BMC includes a processor having its own "boot" code and "operational" code, typically stored in flash memory. The operational code defines what functions are available to be managed via the OOB connection. The operational code typically provides the interfaces for monitoring the server's health and chassis control. If the BMC operational code becomes corrupted, it will be difficult or impossible to manage the server via the OOB connection. The system may continue to operate with corrupted operational code, but the server management tasks may not work properly and the system typically cannot be turned off without the BMC functioning. Occasionally, it is also desirable to update the operational code with added, deleted or modified functionality, even if the code has not been corrupted.

Currently the operational code is updated manually. With the move toward deploying servers without floppy drives and CD-ROM drives, updating the operational code can be difficult. In some cases, a removable media drive must be connected to the server prior to attempting an update of the operational code. In other cases, the flash memory must be removed and loaded onto an external system to be rewritten in the lab or replaced. These methods increase the downtime of the server and may possibly lead to lost revenue for the owner of the server.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to automatic firmware image recovery. When a server equipped with a baseboard management controller (BMC) boot code detects that its operational code image (opcode) is corrupted or the operational code detects that the opcode is out of date, the BMC broadcasts a request for an image update. One or more donor systems on the network may respond to the request and send the requestor a new image. With the application of this invention, the image can be updated automatically without the presence of a technician or system administrator, thereby lowering the total cost of ownership for customers.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Figure 1:
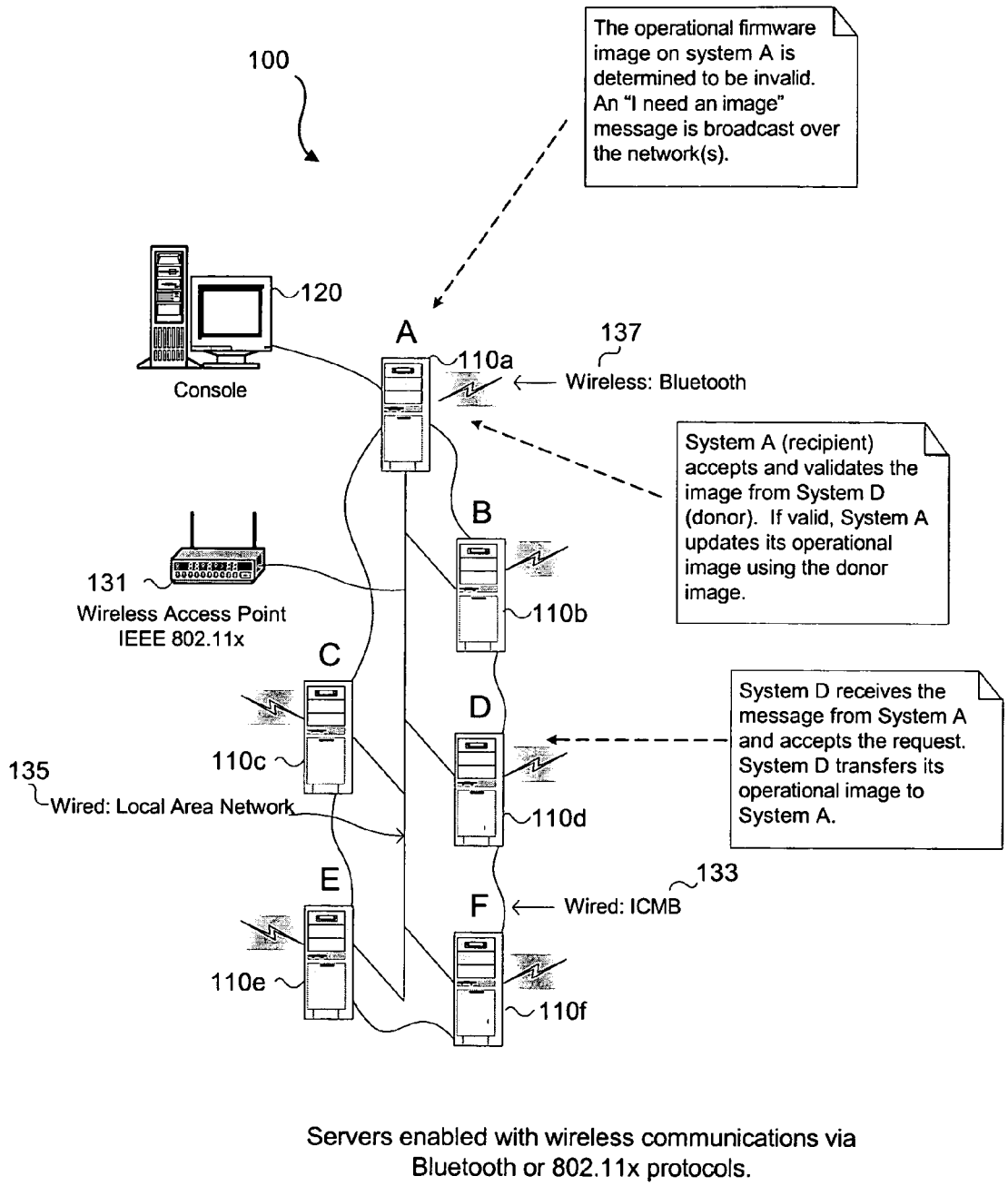
FIG. 1 is a block diagram illustrating an exemplary network of servers according to an embodiment of the invention.

FIG. 1 is a block diagram illustrating an exemplary network of servers according to an embodiment of the invention. Network 100 may include a variety of servers 110*a-f*, a management console 120, and a wireless access point 131 using, for example, the WEEE 802.11x communication protocol. The servers may be communicatively coupled via a wired inter-chassis management bus (ICMB) 133 or typical Ethernet local area network (LAN) 135, a wireless 802.11x protocol via a wireless access point 131 or Bluetooth 137, network or any combination of the above.

A BMC boot block is an image in the flash that the BMC first executes when the server is connected to power, i.e., being plugged into a wall electrical outlet. The boot block is responsible for validating the operational code, which is a separate image, typically stored in the same firmware or flash memory. The operational image may be updated by the customer or client. In existing systems, the BMC boot block is not updated in the field. In one embodiment, the boot block has the capability to communicate to its NIC through a management link such as I2C, a bus protocol developed by Philips Semiconductors, or to a wireless device (e.g., Bluetooth®).

In one embodiment, it is determined that the operational firmware image on server A 110*a* is invalid or corrupted. For purposes of this discussion, the system with the corrupted BMC operational code which broadcasts a request for verified code is called the "recipient" system. The responding system is called the "donor" system. Server 110*a* broadcasts a message over one or more of the available networks. In one embodiment, the system administrator may pre-select which types of networks may be used to broadcast this message. The message sent by server A 110*a* is a request for a new firmware image. The message typically includes data identifying the requesting server (recipient) which may include the server's IP address and/or a digital signature, the version of firmware image requested and server type. In some embodiments, the recipient server may also send other information such as to identify the existing problem, an identifier for a preferred donor, and/or authentication information.

Server A 110a may broadcast its message request via a LAN, or other communication channel. In existing systems, there is often no network capability in the BMC boot block because it adds complexity to the code. However, the BMC may have access to its own network interface card (NIC). If the boot block of server A 110a has network capability in its boot block, then it may broadcast the request through the OOB connection, also.

In one embodiment, the network server to be managed is compatible with the Intelligent Platform Management Interface (IPMI). The IPMI is a communication protocol for LANs or modem communication to a baseboard management controller (BMC). The IPMI 1.5 specification, jointly developed by Intel Corporation, Hewlett-Packard Company, NEC Corporation and Dell Computer Corporation, for instance, defines a mechanism by which an Out-Of-Band (OOB) connection can pass data back and forth across a variety of networks via the BMC. Information regarding the IPMI 1.5 specification can be found on the Internet, specifically on the web site of Intel Corporation at http:H/developer.intel.com/design/servers/ipmi. In existing systems, Server Management Software (SMS) uses the IPMI mechanism to determine the operating system (OS) version of the server as well as to perform a shutdown of the OS remotely. These actions are typically performed through the use of an OS resident agent, such as Intel® Server Management, called Platform Instrumentation (PI).

As discussed above, the recipient server's NIC may be capable of communicating over any type of network. FIG. 1 shows a wireless LAN or 802.11, Bluetooth®, and a wired ICMB. An ICMB is an RS485 communication channel. This type of channel is defined in the IPMI 1.5 specification. The request message transmission protocol will depend on which communication channel is selected and is defined by the IPMI specification. The content of the message is implementation dependent. It will be apparent to one of ordinary skill in the art that many message formats may be implemented. Part of the message may identify specifics about the needed operational code, e.g., version or model or part number, etc. In the example shown in FIG. 1, the message is transmitted over a network to systems 110b-f, as well as the management console 120. The first system to respond may be the one to negotiate. In another embodiment, there is a policy on the corrupted machine to decide with whom to negotiate. The policy will typically pick the best match. It will be apparent to one of ordinary skill in the art that there are multiple ways to implement this. In one embodiment, the recipient system may want to accept a previous version of the operational image because a version update is what corrupted it. This preference may be configured as a policy.

The IPMI specification does not define a set of commands for firmware updates. Firmware update commands are OEM (original equipment manufacturer) specific commands which are available via any interface according to the BMC specification. In existing systems, the firmware update commands are proprietary for specific hardware. The BMC only gets a small set of data from the OS, and currently those commands are proprietary. In state of the art systems there is no way to update the firmware via OOB connections when the operational code is corrupted. The BMC sends commands to the OS, i.e., get the OS version number, perform graceful shutdown, initiate reset, etc. The OS may obtain information from the BMC. The IPMI specification defines multiple interfaces for communication with the BMC and for getting information that the BMC provides. The BMC has a host interface which is what BIOS and OS use to communicate to the BMC. The host interface is defined in the IPMI standard. A local area network (LAN) can be used to communicate with the BMC through OOB where the network has information that is directly routed to the BMC. This communication may be over serial, dial up modem or other direct serial connection. IPMB (intelligent platform management bus) allows another device within the server itself to exchange information with the BMC such as an intelligent hotswap backplane, such as a small computer system interface (SCSI) redundant array of independent disks (RAID) backplane. The intelligent chassis management bus (ICMB) is a way of connecting BMCs together so the BMCs can exchange information. It is a private management network. These interfaces typically share essentially the same command set, but use different protocols for the transport mechanism, e.g., serial (basic or point to point protocol (PPP) or terminal mode) or LAN using User Datagram Protocol (UDP), Transfer Control Protocol (TCP), remote mail checking protocol (RMCP) or ICMB, IPMB, etc., but the actual message data is the same. It will be apparent to one of ordinary skill in the art that proprietary connections and interfaces may be used.

In existing systems, the BMC boot block does not contain the capability to communicate via any interface except the host interface. Only the host interface can communicate with the boot block. The other interfaces, except for the host interface, all exist in the operational code. In existing systems, if the operational code is not valid, then the BMC cannot communicate over any of those interfaces. The drivers do not exist in the boot block because it is desirable to keep the boot block small and as simple as possible. The disclosed system and method is not necessarily limited to inclusion of a network stack; IPMB, LPC and ICMB may be used as well. When the network stack is moved into the boot block, it allows the boot block to communicate over a LAN in addition to the host interface. Thus, when the server is being controlled by the boot block, i.e., before the operational code has been loaded, the server has the capability to communicate over the LAN or other interfaces, including proprietary interfaces, as it does in existing systems using the operational code.

Figure 2:
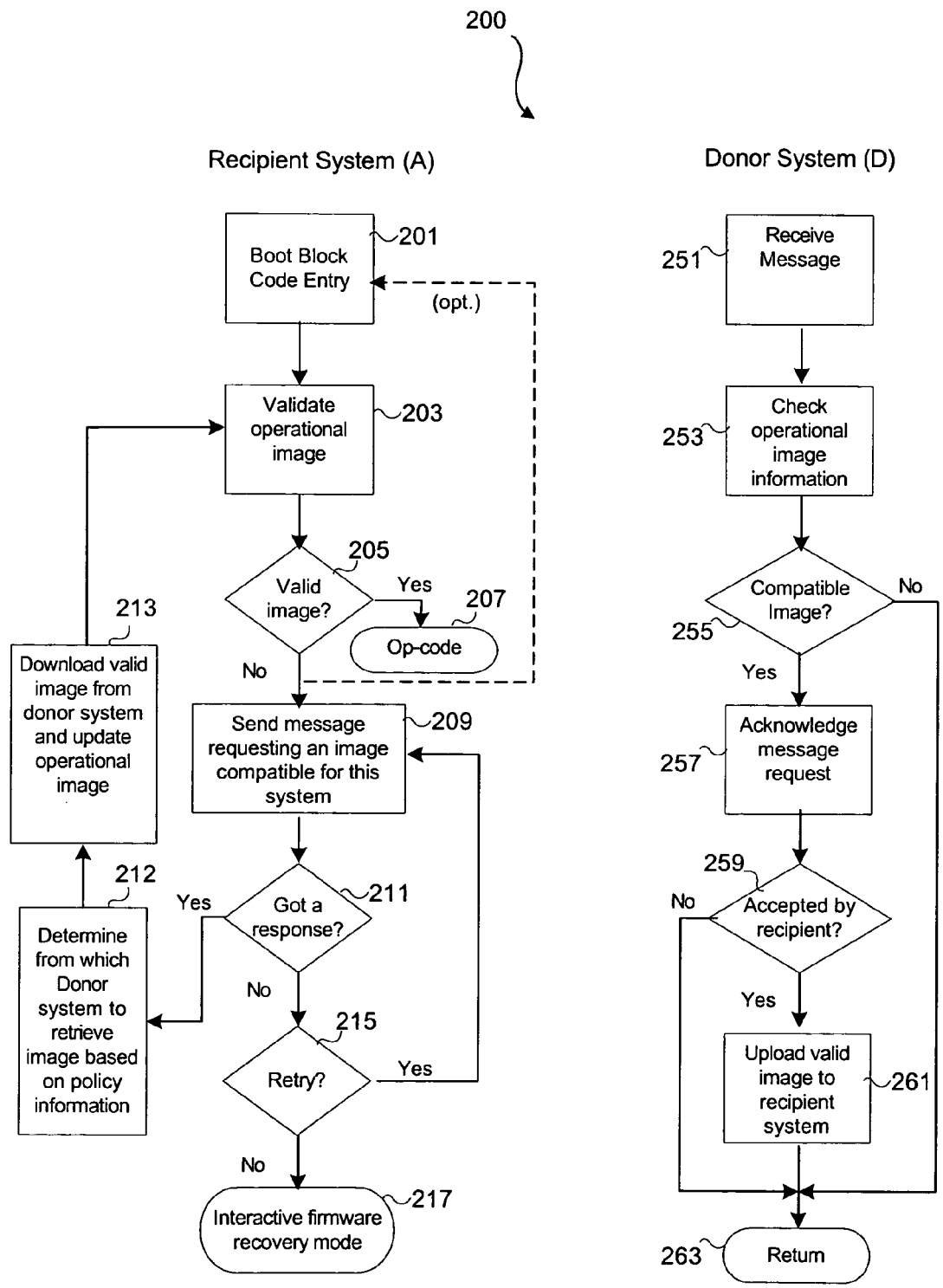
FIG. 2 is flow diagram illustrating an exemplary process for requesting and receiving a firmware update image for both a donor and recipient system, according to an embodiment of the invention.

Referring now to FIG. 2, there is shown a flow diagram 200 of the interaction between recipient systems and donor systems, according to an embodiment of the disclosed system and method. The recipient system 110a enters or executes its boot block code, typically upon startup, in block 201. The recipient system examines/validates its operational image in block 203. Boot block code entry is when the system gets plugged into the wall (electrically powered), but not specifically booted. The BMC gets started up and control is transferred to the vector to boot from the boot block. The operational image is then scanned and validated. A device information block (dib) may be identified and signature verified. If the signature is not found, then the operational image (opcode) is assumed to be bad. A checksum or cyclic redundancy check (CRC) may also be compared. If the opcode image is valid, then the BMC branches execution to the operational code 207. If the image is bad then the BMC may initiate a soft reset and return control back to the boot block 201 to try again. However, if there is malicious firmware intentionally sabotaged, then the BMC may not get be able to reboot from the boot block if rebooting depends on the operational code. The boot block code may attempt to boot the operational code a specified number of times before declaring it to be corrupted. The boot block code may use a variety of known techniques for determining whether the image is valid.

Again, if the image is valid, as determined in block 205, then the operational code is loaded and the recipient system continues to boot in block 207. If the recipient system verifies that its operational code is corrupt or bad, and rebooting is not an option or maximum reboots have been attempted, the BMC broadcasts a message declaring that it needs a new operational code image in block 209. Other "donor" systems (110b-f and 120) on the communication network may receive the broadcast message (block 251) and validate the received request to see if the request matches their parameters. For instance, the donor system may check to see if the requested version matches the version of operational code in its repository. In another embodiment, the donor system may compare policy parameters to determine if it is the preferred provider of the operational image. The donor system checks the operational image information for any images in its possession in block 253. If the donor system does not have a compatible image, as determined in block 255, then it may ignore the request and continue to operate normally (block 263). In one embodiment, the donor system sends an acknowledgement message that declares the receipt of the broadcast message with a failure code meaning that no compatible image is present. In one embodiment, a broadcast message specifically targets one or more servers or a management console. In one embodiment, the message targets any compatible system, i.e., one that is used as an image repository and has the appropriate image. If the message is validated by the donor system, the donor system offers the image with a positive acknowledgment message in block 257. The recipient computer may have a policy to choose which offer to accept, if there is more than one offer. In one embodiment, an offer from a management console will be accepted ahead of all other offers. In another embodiment, an offer of a more recent version is preferred, and multiple donors with the same version may be chosen based on proximity to the recipient system. It will be apparent to one of ordinary skill in the art that a variety of policies may be implemented on one or both of recipient and donor system.

The recipient determines whether an acknowledgement is received in block 211. The recipient system will also follow policy directives to determine which response to accept and send an acceptance message to the desired donor system in block 212. The policy may be as simple as taking the first proffered image, or may be more complicated as discussed above. The donor system determines whether its offer has been accepted in block 259. If so, the donor system uploads the valid image to the recipient system via whatever communication mechanism has been chosen, in block 261. In one embodiment, the message exchange may use a different communication channel than the image upload. Once the transfer is negotiated and the operational code image is transferred to the recipient computer, the operational firmware is written over with the new image in block 213 where the recipient system validates the operational image as before in block 203. If the recipient system does not receive a proper reply from a donor system, as determined in block 211, it may retry broadcasting a message searching for an image to update. If retry mode is enabled, a determination is made as to whether a maximum number of retries has been reached in block 215. If the maximum has not been reached, then another message is sent requesting an update (block 209). If another retry is not warranted, the process proceeds to interactive firmware recovery mode in block 217 which will typically involve user intervention, as the automatic update did not complete successfully.

Figure 3:
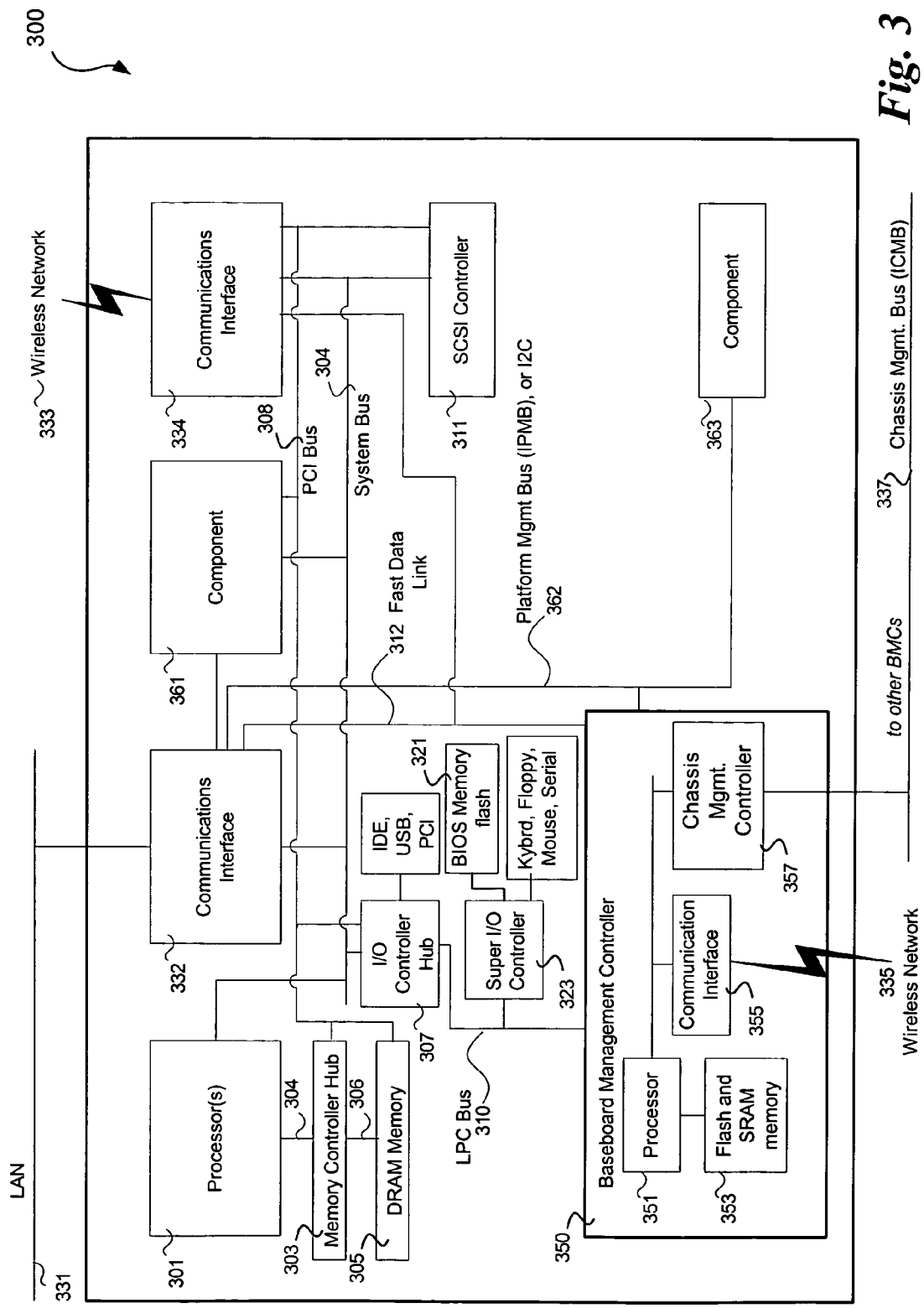
FIG. 3 is a block diagram showing an exemplary server with baseboard management controller (BMC) that may be used with at least one embodiment of the disclosed invention.

FIG. 3 is a block diagram of an exemplary server 300 as may be used in embodiments of the disclosed system and method. A server 300 has one or more processors 301. Processor 301 communicates with a memory controller hub (MCH) 303, also known as Northbridge, via the front side bus (system bus) 304. The MCH 303 communicates with system memory 305 via a memory bus 306. The MCH 303 may also communicate with an advanced graphics port (AGP, not shown) via a graphics bus. The processor communicates over the system bus 304 to an I/O controller hub (ICH, also known as the south bridge) 307. The MCH 303 communicates with the I/O controller hub (ICH) 307 via a peripheral component interconnect (PCI) bus 308.

A baseboard management controller 350 may be connected to the processor via a low pin count (LPC) bus 310. The BIOS image 321 is typically connected to the processor 301 via the LPC 310, as well, and may be connected via a super I/O controller (SIO) 323. The processor 301 may be operatively connected to a number of networks 331, 333. The processor may be operatively connected to a local area network (LAN) via a network port, for instance, a network interface card (NIC) 332 through the ICH 307. The processor may be connected to a wireless network 333 via a communication interface 334. The processor 301 may be connected to the BMC 350. The BMC connects to other components 361, 363 via the platform management bus 362. The BMC 350 has its own processor 351 and memory 353. The BMC may be operatively connected to a variety of networks, for instance, it may be connected to a wireless network 335 via a communication interface 355. The BMC host interface is typically via the LPC interface 310 between the ICH 307, SIO 323 and BMC 350. The BMC chassis controller 357 operatively connects to a chassis management bus 337. The BMC may also be operatively connected to the LAN 331 via a fast data link 312 to communication interface 332. The Fast Data Link 312 may be a fast mode (400 KBs) or high-speed mode (3.4 Mbs) I2C bus interface, where a standard I2C is typically a 100 Kbs communication link. The BMC may also be connected to a wireless network 333 via the fast data link 312 through a communications interface 334.

The techniques described herein are not limited to any particular hardware or software configuration; they may find applicability in any computing, consumer electronics, or processing environment. The techniques may be implemented in hardware, software, or a combination of the two. The techniques may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, that may include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system cause the processor to perform an action of produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method for automatic firmware image recovery, comprising:
   determining that a firmware image for server management operational code in a baseboard management controller (BMC) in a recipient system needs to be replaced;
   sending a message over a network by the recipient system, wherein the message requests a compatible replacement firmware image;
   negotiating with a donor system based on a received acknowledgement that the donor system has a compatible image, using a predetermined policy to select the donor system from a set of at least one donor system having a compatible image, wherein at least one donor server of the set of at least one donor system sends an acknowledgement to the recipient system in response to the sent message, and negotiating further comprises:
      receiving a message request by at least one donor system in the network;
      determining whether the donor system has a compatible image; and
      when the donor system has a compatible image, sending an acknowledgement and offer to the recipient system;
   uploading the compatible image sent by the donor system to the recipient system; and
   updating the recipient system server management firmware with the uploaded compatible image.

2. The method as recited in claim 1, wherein the network is selected from the group consisting of a wired and unwired network.

3. The method as recited in claim 1, wherein the message is sent via an out-of-band (OOB) connection.

4. The method as recited in claim 3, wherein the baseboard management controller residing on the recipient system is capable of communicating to donor systems via at least one communication means, wherein the communication means is selected from a group consisting of a local area network (LAN), a wireless access point, a wired inter-chassis management bus (ICMB), and a Bluetooth® protocol wireless network.

5. The method as recited in claim 1, wherein the donor system comprises a management console.

6. The method as recited in claim 1, wherein the donor system comprises a peer server in the network.

7. A storage medium containing instructions that, when executed, cause a machine to:
   determine that a firmware image for server management operational code in a baseboard management controller (BMC) in a recipient system needs to be replaced;
   send a message over a network, wherein the message requests a compatible replacement firmware image;
   negotiate with a donor system based on a received acknowledgement that the donor system has a compatible image, using a predetermined policy to select the donor system from a set of at least one donor system having a compatible image, wherein at least one donor system of the set of at least one donor system sends an acknowledgement to the recipient system in response to the sent message, wherein negotiating with a donor system further comprises instructions to:
      receive an acknowledgement from the donor system in response to the message request sent over the network, where an acknowledgement is sent by each donor system having a compatible image;
      when more than one acknowledgement is received by the recipient system, select a donor system from the set of at least one donor system sending an acknowledgement, based on the predetermined policy, and when only one acknowledgement is received, select the one donor system sending the acknowledgement; and
   receive a compatible image for server management from the selected donor system;
   upload the compatible image sent by the donor system to the recipient system; and
   update the recipient system server management firmware with the uploaded compatible image.

8. The storage medium as recited in claim 7, wherein the network is selected from a group consisting of a wired and unwired network.

9. The storage medium as recited in claim 7, wherein the message is sent via an out-of-band (OOB) connection.

10. The storage medium as recited in claim 9, wherein a baseboard management controller residing on the recipient system is capable of communicating to donor systems via at least one communication means, wherein the communication means is selected from a group consisting of a local area network (LAN), a wireless access point, a wired inter-chassis management bus (ICMB), and a Bluetooth® protocol wireless network.

11. The storage medium as recited in claim 7, wherein the donor system comprises a management console.

12. The storage medium as recited in claim 7, wherein the donor system comprises a peer server in the network.

13. A storage medium containing instructions that, when executed, cause a machine to:
  receive a message over a network, by a donor system, the message sent by a recipient system requesting an updated server management firmware image, wherein the message is sent to at least one donor system on the network;
  determine by the donor system whether a compatible image to the requested updated firmware image is available to fulfill the request;
  when the donor system has a compatible image, negotiate with the recipient system, the recipient system to use a predetermined policy to select the donor system from at least one donor system having a compatible image, wherein negotiating further comprises instructions to send an acknowledgement and offer to the recipient system when the donor system has a compatible server management image; and
  when the donor system is selected from the at least one donor system having a compatible image, by the recipient system, upload the compatible server management image to the recipient system.

14. The storage medium as recited in claim 13, wherein negotiating comprises instructions that cause the machine to:
  receive an acceptance acknowledgement for the offer.

15. A system for automatic firmware image update, comprising:
  a recipient server having at least one processor;
  a baseboard management controller (BMC) operatively coupled to the at least one processor, wherein the BMC comprises a BMC processor, a memory operatively coupled to the BMC processor, a communication interface enabling at least one of wireless network, chassis management bus and local area network communication, wherein the BMC is configured to execute operational firmware code; and
  executable code loaded in memory accessible to the BMC processor that when executed enables the BMC to:
  determine whether operational firmware requires update;
  send a request for an updated image via a network communication interface to at least one donor server in the network;
  negotiate with the at least one donor server for a compatible image, based on a received acknowledgement and offer that the at least one donor system has a compatible image, where the BMC is configured to use a predetermined policy to select a donor system from a set of the at least one donor system having a compatible image and returning an acknowledgement and offer in response to the request for an updated image;
  receive an update compatible image from the selected donor system; and
  load the updated compatible operational firmware image in non-volatile memory on the BMG.

16. The system as recited in claim 15, wherein the request is sent via an out-of-band (OOB) connection.

17. The system as recited in claim 15, wherein the donor system comprises a management console.

18. The system as recited in claim 15, wherein the donor system comprises a peer server in the network.

19. A method for providing a firmware image, comprising:
  receiving a message over a network by a donor system on the network, the message sent by a recipient system requesting an updated firmware operational server management image, where the message is sent to at least one donor system on the network;
  determining by the donor system whether a compatible image is available to fulfill the request;
  when the donor system has a compatible image, negotiating with the recipient system which uses a predetermined policy to select the donor system from the at least one donor system having a compatible image, wherein negotiating further comprises sending an acknowledgement and offer to the recipient system when the donor system has a compatible operational server management image, and receiving an acceptance acknowledgement for the offer; and
  when the donor system is selected from the at least one donor system having a compatible image, uploading the compatible operational server management image to the recipient system.

20. The method as recited in claim 19, wherein negotiating further comprises:
  receiving an acceptance acknowledgement for the offer.

21. The method as recited in claim 19, wherein the network is selected from the group consisting of a wired and unwired network.

22. The method as recited in claim 19, wherein the message is sent via an out-of-band (OOB) connection.

23. The method as recited in claim 19, wherein the donor system comprises a management console.

24. The method as recited in claim 19, wherein the donor system comprises a peer server in the network.

* * * * *